United States Patent

Breed et al.

Patent Number: 5,326,133
Date of Patent: Jul. 5, 1994

[54] SENSOR AND BRACKET ASSEMBLY

[75] Inventors: David S. Breed, Boonton Township, Morris County; Scott D. Phillips, Rockaway, both of N.J.

[73] Assignee: Automotive Technologies International Inc., Denville, N.J.

[21] Appl. No.: 795,035

[22] Filed: Nov. 20, 1991

[51] Int. Cl.$^5$ ............................................. B60R 21/32
[52] U.S. Cl. ...................................... 280/735; 180/274
[58] Field of Search ................. 280/734, 735; 180/282, 180/68.6, 274; 293/4, 115; 200/61.44, 61.45; 248/900, 909, 548, 213.32

[56] References Cited

U.S. PATENT DOCUMENTS

| | | | |
|---|---|---|---|
| 1,387,100 | 8/1921 | Buck | 293/115 |
| 1,791,841 | 2/1931 | Radford | 180/68.6 |
| 2,054,538 | 9/1936 | Graves | 180/68.6 |
| 2,225,364 | 12/1940 | Bagnall | 293/115 |
| 2,253,041 | 8/1941 | Morse | 293/4 |
| 2,406,587 | 8/1946 | Cooper | 248/909 |
| 3,848,695 | 11/1974 | Lacaze, Jr. | 280/735 |
| 3,850,482 | 1/1975 | Matsui et al. | 200/61.44 |
| 4,083,032 | 4/1978 | Nakamura et al. | 200/61.45 R |

FOREIGN PATENT DOCUMENTS 2197973 6/1988 United Kingdom ................. 280/734

*Primary Examiner*—Karin L. Tyson
*Attorney, Agent, or Firm*—Samuel Shipkovitz; Karl F. Milde, Jr.

[57] ABSTRACT

A sensor and bracket assembly designed for arrangement in the crush zone of a motor vehicle, is operative to determine when and if a crash of the vehicle is severe enough to deploy a passive restraint system (i.e., air bag or seat belt tensioner). The sensor is preferably of the crush switch type but may also be electronic of electromechanical. The bracket is designed to lie in the crush zone for a wide spectrum of crashes including those that involve only a portion of the vehicle front end including partial bumper over-rides and under-rides. The bracket may be either a separate part of the desired shape may be incorporated into the design of some part of the vehicle structure such as the radiator supports. The assembly may incorporate a single or multiple brackets and a single or multiple sensors. The essence of the invention is that the bracket is comprised of two ends and at least one deformable section which deforms in a predictable controlled manner upon the bracket being impacted in a crash condition desired to be detected. The bracket is placed a scientifically or otherwise predetermined distance back from the frontmost part of the vehicle depending on the crash and car specifications to be detected, or prescribed depth in order to timely deploy an air bag or the like. In an airbag deployment desired crash, the vehicle crushes to at least the "prescribed depth" at which time the bracket deforms predictably and the sensor detects this deformation and initiates deployment of the airbag.

39 Claims, 19 Drawing Sheets

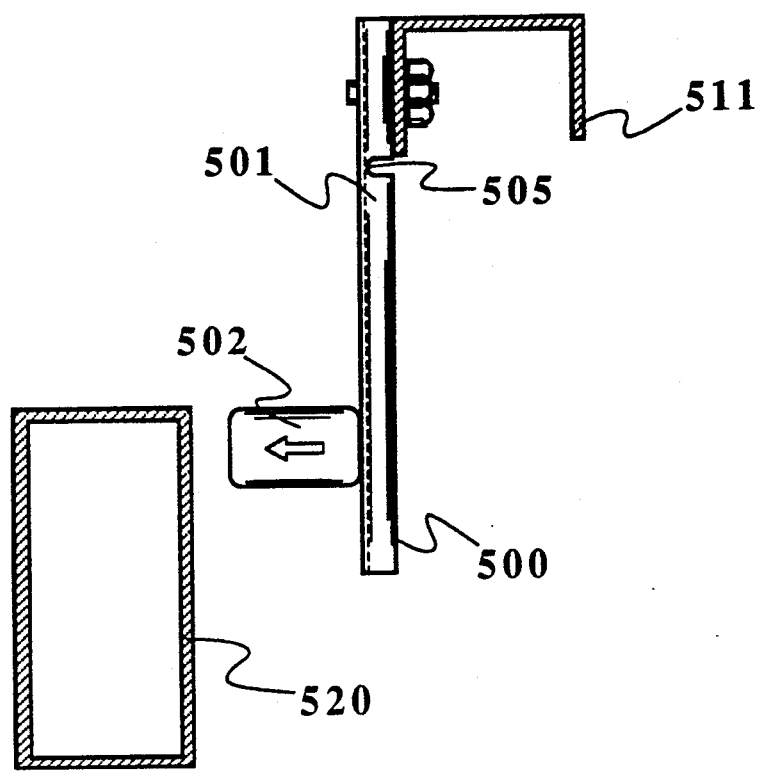
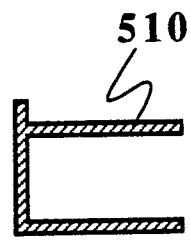
FIG. 5G

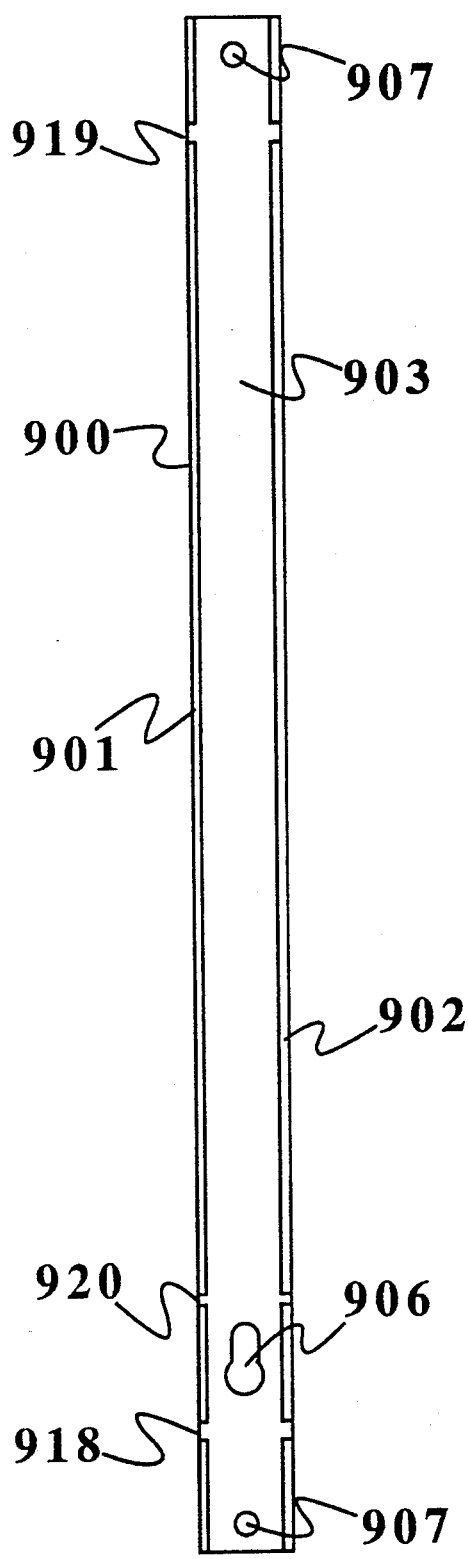 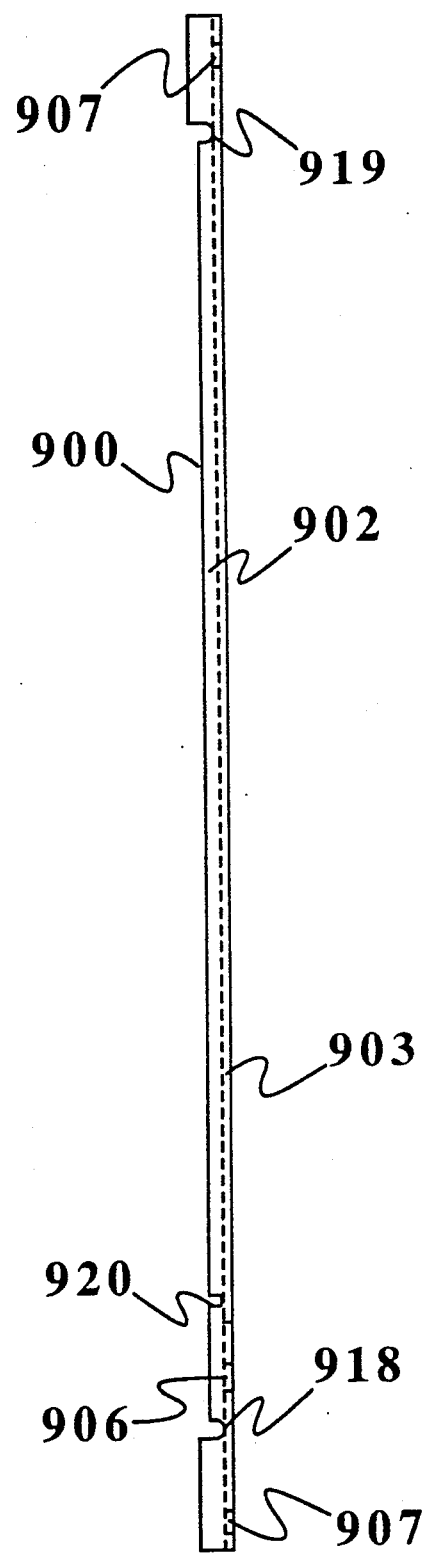
*FIG. 9A*   *FIG. 9B*

SENSOR AND BRACKET ASSEMBLY

BACKGROUND OF THE INVENTION

Crash sensors for determining that a vehicle is in a crash of sufficient magnitude as to require the deployment of an inflatable restraint system, or air bag, are either mounted in a portion of the front of the vehicle which has crushed by the time that sensor triggering is required, the crush zone, or elsewhere such as the passenger compartment, the non-crush zone. This invention is concerned with crush zone mounted sensors.

The ball-in-tube crush zone crash sensor, such as disclosed in U.S. Pat. Nos. 4,974,350; 4,198,864; 4,284,863; 4,329,549; 4,573,706 and 4,900,880 to D. S. Breed, has achieved the widest use while other technologies, including magnetically damped sensors as disclosed in U.S. Pat. No. 4,933,515 to Behr et al and crush switch sensors such as disclosed in U.S. Pat. No. 4,995,639 to D. S. Breed, are now becoming available. All of these sensors, except for some implementations of the crush switch technology, are point sensors. That is, they require that either the intruding object or material located in front of the sensor strike the relatively small front of the sensor in order for the sensor to function properly. These sensors can be called point sensors due to the small area covered by the sensors. Some implementations of the crush switch technology, such as ribbon switches, cover a much wider area of the crush zone and are line sensors, however, it has been found that there is usually insufficient available structure at the proper location in the crush zone to mount ribbon switches.

In some accidents, material in front of point sensors is not displaced rearward in time to impact the sensor and cause timely deployment of the restraint system. In these cases the sensor may either respond to the overall crash pulse in which case air bag deployment will be late, as disclosed in U.S. Pat. No. 4,900,880, or the sensor may not trigger at all. If the sensor triggers late, the occupant may be out of position and even resting against the air bag when it deploys. In this case the occupant can be killed or seriously injured by the air bag deployment, as discussed in SAE Paper 826047 "Responses of Animals Exposed to Deployment of Various Passenger Inflatable Restraint System Concepts for a Variety of Collision Severities and Animal Positions", by H. J. Mertz et al.

In many point sensor implementations, the sensor is mounted higher than the bumper so that the material in front of the sensor above the bumper must be impacted during the crash in order to cause the sensor to deploy in a timely manner. Although these sensors work well in under-ride accidents where the bumper of the vehicle rides under the object being struck, many accidents do not result in a direct impact with the material in front of the sensor. Some accidents, such as impacts with guard rails, only involve direct impact with the bumper and other accidents, called "bumper over-ride" accidents, involve impacts with the vehicle below the bumper. Although these are common, accounting for about 2% of real world accidents, present day crush zone sensor systems can fail to sense these accidents in time.

The "crush zone" of a vehicle can be defined, for the purpose of this invention description, to include that portion of the front of the vehicle which has crushed up to the time that sensor triggering is required. In a frontal barrier impact, the material in the crush zone has substantially stopped while the material in the non-crush zone is continuing to move at nearly the pre-crash velocity.

The required sensor triggering time is frequently determined to be 30 milliseconds prior to the time that an unrestrained occupant has moved a total of 5 inches (about 0.128 m.) relative to the passenger compartment. By this definition, it can be seen that the crush zone will vary from crash to crash and from one part of the front of the vehicle to another. The crush zone in a frontal barrier crash might stretch 10 inches (about 0.26 m.) back from the front-most point of the bumper for a location above the bumper, while it might stretch 13.5 inches (about 0.3 ml) back for a location directly behind the bumper. This is because, at the time that sensor triggering is required, the bumper may have a crushed thickness of 4 inches (about 0.1 m.) while the material above the bumper, such as the grill, may have a thickness of only 0.5 inches. On the other hand, for a bumper under-ride crash where the required sensor triggering time is considerably later, the crush zone above the bumper might be 13 or more inches back.

An approximate surface can be defined by subjecting a group of identical vehicles to a series of 10 MPH (about 17 kilometers per hour) crashes, for example, at different angles and different vertical engagements with the vehicle. These crashes would include fixed barriers placed at a variety of angles from −45° to +45° and at different elevations so that sometimes the impact is only below the bumper (bumper over-rides), at others only at the bumper, and at still others only above the bumper (bumper under-rides). Assuming that 10 MPH was the marginal velocity at which deployment of a passive restraint was desired, this 10 MPH (about 17 kilometers per hour) crush zone boundary surface would define the location for mounting of crush switch crash sensors. It would also form the location of the most rearward mounting positions for velocity change crash sensors. In practice, velocity change sensors are almost always mounted at the boundary determined by full frontal barrier impacts only.

Because of the thickness of the bumper, the 10 MPH (about 17 kilometers per hour) zone boundary is usually several inches further rearward for locations in line with the bumper than for other locations for full frontal barrier impacts. Point sensors, which are usually mounted above the bumper so that they will catch under-ride crashes, must project several inches further forward than they would if they were able to sense the rearward motion of the bumper. In many cases this results in the sensors projecting forward of the radiator into the open space behind the grill leaving them vulnerable to being rotated or damaged by maintenance or through wear and tear on the vehicle over its life.

SUMMARY OF THE INVENTION

The bracket and sensor assembly of this invention is adapted for installation in the crush zone of an automotive vehicle equipped with a passenger protective device such as an inflatable air bag or seat belt tensioner. When the vehicle is subjected to a crash of sufficient magnitude as to require deployment of the passive protective device, a portion of the front of the vehicle is crushed rearward until it contacts the sensor or bracket. At least a portion of the sensor and bracket assembly is then accelerated approximately to the velocity of the material contacting it and, simultaneously, it deforms by bending or twisting. The bracket has an elongate form and its deformation, or change in velocity, is sensed by an appropriate sensing mechanism which is either mounted onto the bracket or adjacent to and interacts with the bracket.

The elongate bracket is preferably mounted so as to cover a strip of the crush zone of the vehicle giving sensitivity to a larger variety of crashes. According to a preferred implementation, the elongate bracket extends in a vertical direction from substantially above the bumper to below it, and two such sensor and bracket assemblies are mounted on the vehicle, one on each side typically about half of the distance between the vehicle centerline and side.

In another preferred implementation, a single sensor is used in conjunction with elongate brackets to catch all frontal crashes.

It is a principal object of this invention to provide a sensor system which responds in time to crashes which only involve a portion of the front end of the vehicle regardless of whether that portion is above, in line with, or below the bumper.

It is also a principal object of this invention to provide a sensor system which responds in time to crashes which only involve a portion of the front end of the vehicle regardless of whether that portion is in the center or on a side. It is another object of this invention to extend the range of sensitivity of a sensor so that one sensor can sense a large variety of crashes involving different portions of the front end of the vehicle.

Still another object of this invention is provide a structure to minimize rotation of seismic mass sensors during the sensing period.

Yet another object of this invention is to provide a mounting for sensors which protects them from rotation or damage during routine maintenance and abuse throughout the life of the vehicle.

Another object of this invention is to provide a vehicle structure design with portions which project into the crush zone during a crash to transmit the displacement or velocity change of the crash to one or more crash sensors.

It is another object of this invention to provide a structural design for the vehicle which permits all crashes to be sensed using a single sensor which is designed to respond to the crush zone crash pulse.

Other objects and advantages of the present invention will become apparent from the following description of the preferred embodiments taken in conjunction with the accompanying drawings.

BRIEF DESCRIPTION OF THE DRAWINGS

FIG. 5G is a view as in FIG. 2 with an alternate sensor and bracket design using a cantilevered bracket with a seismic sensor mounted thereto.

FIG. 9A is a plane view of a straight elongate bracket designed according to the teachings of this invention as observed from the rear.

FIG. 9B is a side plane view of the elongate bracket shown in FIG. 9A.

DESCRIPTION OF THE PREFERRED EMBODIMENTS

Figure 1:
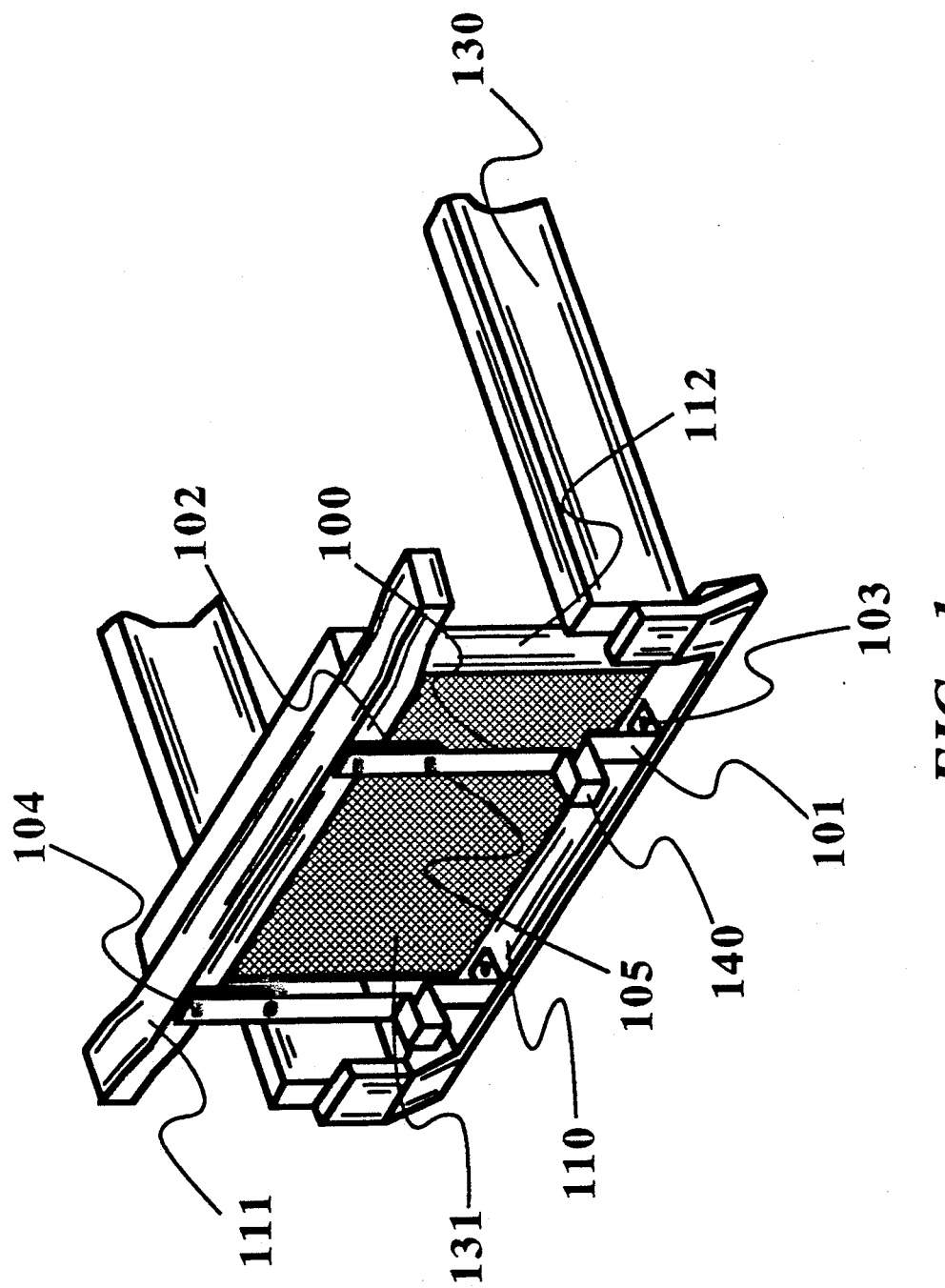
FIG. 1 is a perspective view, with certain portions removed or cut away, of a portion of the front of a vehicle showing preferred mounting locations of the sensor and bracket assembly of this invention in relationship to the frame rails, radiator and radiator support structure of a typical pickup truck vehicle.

A preferred embodiment of the present invention is shown mounted to the structure of the front of a pickup truck in FIG. 1 with most of the vehicle removed. The sensor and bracket assembly is shown generally at 100 and consists of an elongate bracket 101 and a sensor 102. The bracket is mounted to the lower radiator tie bar 110 by means of a bolt 103. It is also mounted to the upper radiator tie bar 111 by bolt 104. Sensor 102 is mounted to the bracket 101 by means of bolts 105.

The radiator 131 is mounted to the upper and lower tie bars and to vertical supports 112 to form the radiator assembly. The radiator assembly is mounted to the frame rails 130 through flexible mounts, not shown, and to the upper supporting structure which has also not been shown.

The elongate bracket 101 is mounted in a generally vertical plane and has a protruding portion 140 which is aligned with the bumper which has also not been shown. During a crash into a barrier the bumper is forced back by the barrier until it contacts bracket projection 140 and begins displacing it rearward. This rearward displacement causes sensor 102 to bend approximately about its midpoint causing contacts within the sensor to close and initiate deployment of the occupant protection system as disclosed in more detail in copending U.S. Pat. application No. 727,757 filed on Jul. 9, 1991 by D. S. Breed which is incorporated herein by reference.

Pickup trucks are noted for being stiff vehicles and therefore having a very short duration crash pulse. Typical full size automobiles when crashed into a barrier at 30 MPH stop in about 100 milliseconds while the stopping time for a typical pickup truck is about 65 milliseconds. For this reason, the sensor required triggering time can be as low as 10 milliseconds in a 30 MPH (about 51 kilometers per hour) frontal barrier crash test as compared to typically 20 milliseconds for a full size passenger car. During these first few milliseconds of a crash, when the sensor is required to sense the crash, the vehicle continues moving at close to its precrash velocity. Since 30 MPH is equivalent to 528 inches (about 13.5 m.) per second, the barrier is crushing into the vehicle at a rate of 0.528 inch per millisecond. If there were nothing in front of the sensor, and if the sensor triggers as soon as it is struck by the barrier, it would have to be mounted no more than 5.28 inches (about 13.5 m.) from the front of the vehicle bumper if it is to sense the crash 10 milliseconds after the front of the bumper has touched the barrier.

Naturally, since there is usually material forward of the sensor, this location can be displaced rearward by the thickness of the crushed material which impacts the sensor. However, sensors never sense the crash instantly when they are impacted during the crash and, therefore, the sensor must be moved forward by the displacement needed to cause the sensor to actuate in a 30 MPH barrier crash. A ball-in-tube sensor, for example, can require 0.5 inches of displacement in order to trigger and the crush switch sensor of the above referenced patent application requires a rotation of a few degrees to trigger.

If it is assumed that the displacement needed to trigger the sensor and the thickness of crushed material striking the sensor are about equal for sensor mounting locations above the bumper, the sensor in this case would have to be mounted about 5 inches from the front of the vehicle bumper in order to catch the 30 MPH barrier crash in time. However, 5 inches from the front of the bumper is slightly in front of the grill for a particular pickup truck and thus the sensor would have to be mounted sticking out of the front of the vehicle.

An alternative exists if use is made of the fact that the bumper retains a significant portion of its thickness at least during the first 20 milliseconds of the crash. The thickness of a crushed bumper at the time sensor triggering is required has been determined to be about 2 inches (about 0.051 m.) for a particular pickup truck, and thus the sensor, if it senses the rearward motion of the bumper can now be 7 inches (about 0.178 m.) from the front of the bumper. This added 2 inches allows the sensor, or bracket as in the present invention, to be comfortably back and out of sight and yet still cause the sensor to trigger the restraint apparatus in time.

Traditionally, sensor mounting locations behind the bumper have been avoided since many crashes occur where the bumper under rides the object being struck. In the case of a car striking the rear of another vehicle, for example, the striking car is frequently being braked causing the front bumper to point downward and impact under the rear bumper of the struck car in front. If the sensors are located behind the bumper, they might not be struck during the accident resulting in either a late deployment of the restraint or no deployment at all. In the present invention, as shown in FIG. 1, the under-ride case will still be caught by the upper portions of the bracket 101 being deformed or displaced.

A pickup truck is much less stiff for impacts that miss the bumper such as the under-ride accident. In this case the sensor required triggering time might be at least 20 milliseconds permitting the sensor to be another 5 inches further back from the front of the bumper. This is accomplished by the shaping of the bracket to place the portion of the bracket that is above the bumper at a position, such as 10 inches, corresponding to the vehicle crush at the sensor required triggering time.

Thus, through the proper shaping of the bracket, the forward facing surface can be placed at the proper distance from the front of the vehicle for the variety of crashes that the vehicle may experience. This permits the very rapid sensing time needed by a stiff pickup truck in a barrier crash while permitting the sensor to be mounted further back and out of sight and yet still function in time for the under-ride case.

Figure 2:
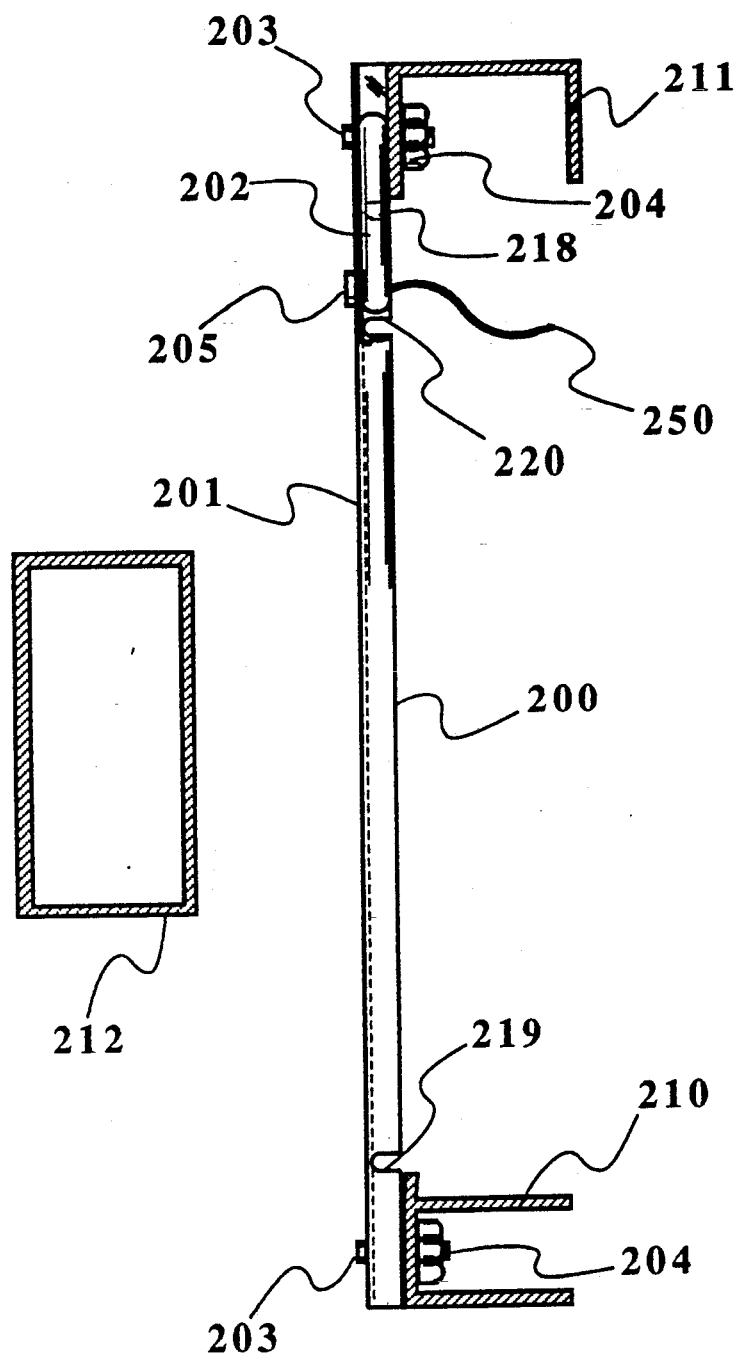
FIG. 2 is a cross section view of the radiator support structure and bumper showing a preferred mounting of the sensor and bracket assembly of this invention, with a portion of the bracket cut away to show the location of the sensor.

FIG. 2 shows a view of another preferred design of the sensor and bracket assembly of this invention, with a portion of the bracket cut away to show the sensor, applied to a sub-compact vehicle. In this case, the sensor triggering requirement was 20 milliseconds for a 30 MPH frontal barrier crash. As a result, the bracket did not have to be designed with a projection to place it closer to the bumper. Since the thickness of the bumper after 20 milliseconds of the crash is still more than 4 inches, the sensor and bracket assembly can be placed adjacent to the upper and lower radiator tie bars where it is well protected from damage during repairs and maintenance or abuse over the life of the vehicle. In conventional sensor mounting designs which do not take advantage of the bumper thickness, the sensor would project about 4 inches forward from the upper radiator tie bar which is not only unattractive but also makes it vulnerable to rotation which would not be detected by the sensor diagnostics and yet would prevent the sensor from triggering properly in a crash.

The sensor and bracket assembly is shown generally as 200 in FIG. 2. It consists of a bracket 201 and a sensor 202. It is mounted to the upper radiator support 211 and to the lower radiator support 210 by bolts and nuts 203 and 204. A rubber mounting plug 205 is a part of sensor 202 and is used to attach the lower end of sensor 202 to the bracket 201.

Figure 3:
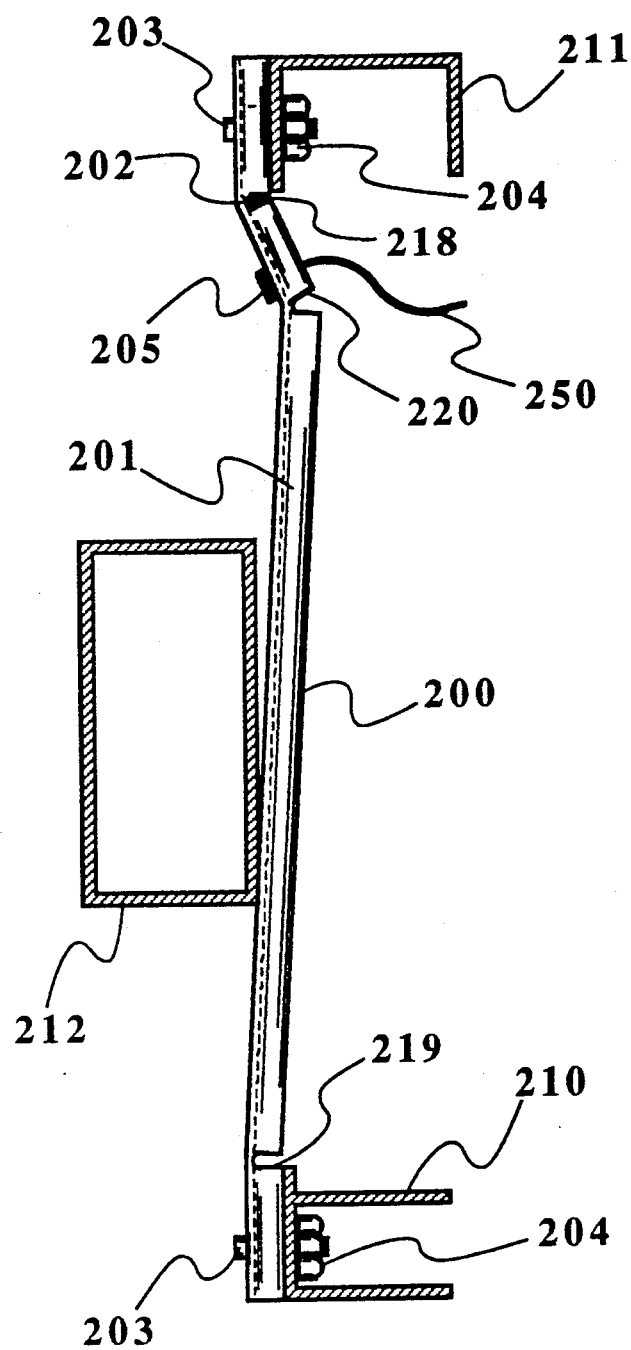
FIG. 3 is a view of the apparatus shown in FIG. 2, without removal of a portion of the bracket, showing the position of the sensor and bracket assembly after being impacted by the bumper in a crash.

The bracket 201 has a C-channel cross section consisting of flange 216 and web 217. In order to control the bending of the bracket during the crash, notches 218, 219 and 220 have been cut into the web 217. Thus, the bracket bends in a controlled and repeatable manner when struck by the bumper 212 as shown in FIG. 3 where like parts have the same numbers.

Wires 250 leave the sensor 202 near the bottom to connect the sensor to the other parts of the occupant restraint system.

In contrast to the pickup truck depicted in FIG. 1, the radiator of the vehicle depicted in FIG. 2 extends substantially below the bumper leaving it vulnerable to impacts which miss the bumper, called bumper over-ride accidents. Such accidents are common (representing about 2% of real world accidents) and occur when the vehicle impacts with a low pole, tree stump, rock, curb, railroad rail or the like. Such accidents can be serious when the vehicle structure extends below the bumper and it is important that such impacts be sensed and the occupant protection apparatus deployed when necessary. In current sensor and bracket designs, this accident would either be sensed late or not be sensed at all as would accidents which only engage the bumper. The sensor and bracket design of this invention would trigger on the bumper over-ride impact since bracket 201 would be displaced along with the lower radiator support 210. In this case the bracket would only bend about the sensor mid-point where the moment is greatest. In addition, notch 220 would close, due to its thin shape, if bending started at that location, and prevent further rotation. This thin shape of notch 220 creates a one way hinge in the bracket. FIG. 3 shows the bumper pushed into the elongate bracket.

Figure 4:
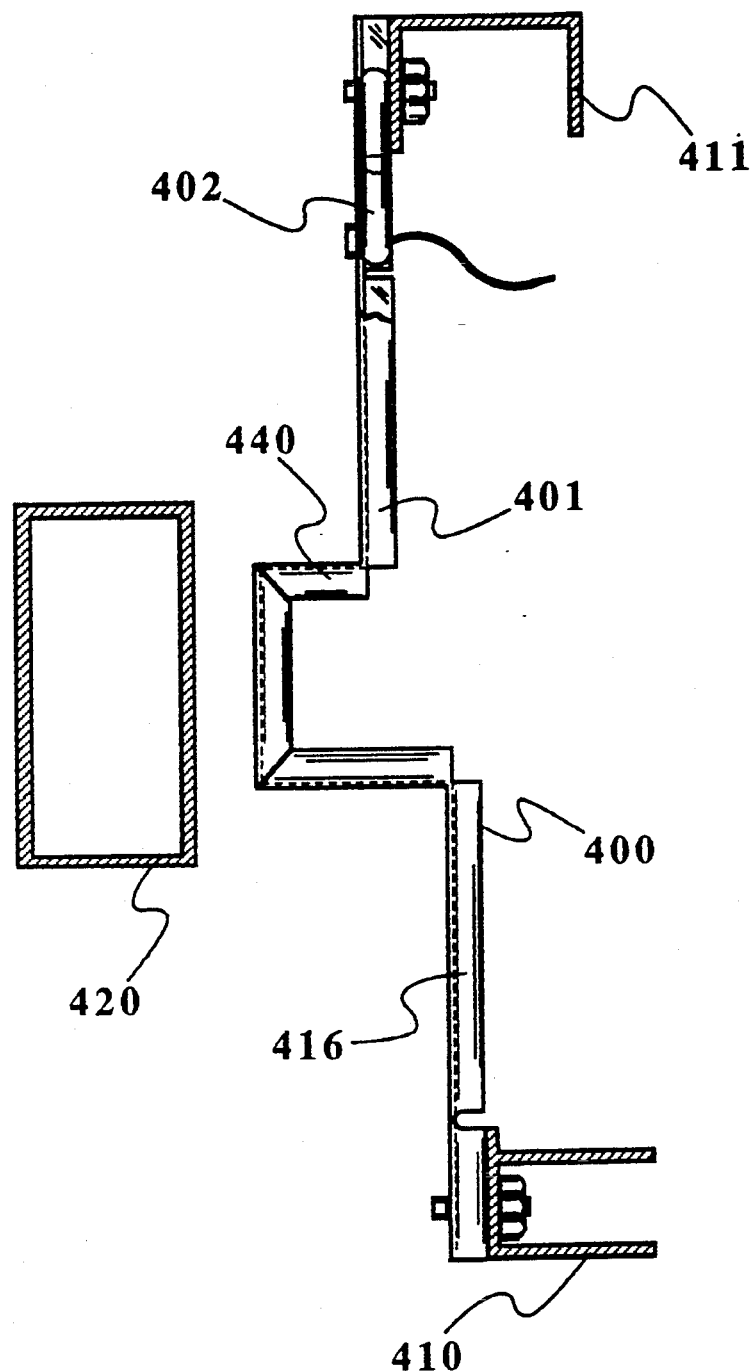
FIG. 4 is view as in FIG. 2 with an alternate bracket design where the position of a portion of the bracket has been moved forward to engage the bumper at an earlier time in the crash.

The shape of the elongate bracket will in general vary from application to application depending on the relative stiffness of various portions of the front end of the vehicle and with the amount of material positioned in front of the bracket. In FIG. 4, another design for a small truck application, the bracket 401 projects forward at 440 to engage the bumper 420 as it is pushed back during a crash to give a very early signal. A bumper under-ride crash, for this case, would be considerably softer since the main structural rails are not involved and thus the sensor 402 and bracket above the bumper is displaced rearward. Finally, the lower portion of the bracket 416 below the bumper is displaced even further to the rear than the upper vertical section. This over-ride impact is believed to be very soft and the sensor required triggering time would be longer. Also, if the bracket were to project in front of the lower radiator support 410 it might be struck by a road stone or other object which would not be of sufficient rigidity as to slow the vehicle significantly and yet the restraint system might deploy. In general, for brackets that project below the bumper it is important to either make them quite strong or to protect them by vehicle structure to minimize unwanted deployments. In FIG. 4 the bracket and sensor assembly is shown generally at 400, the bracket at 401, the sensor at 402, the lower radiator support at 410 and the upper radiator support at 411.

FIGS. 5A through 5I illustrate various implementations of the sensor and bracket assembly of this invention. These implementations vary depending on where the crush zone is on a particular vehicle, the type of sensor used, the location of the bumper, the location of the radiator or other structure onto which the sensor is to be mounted, and the types of crashes that the sensor is expected to sense. In all of these illustrations, it is assumed that the sensor will be mounted from the top of the radiator tie bar. Some air cooled vehicles do not have a radiator and for other vehicles other structural members might be more appropriate or structure may be added to the vehicle for the sensor system. In FIGS. 5A through 5I, the same numbers are used to show similar corresponding parts.

Figure 5A:
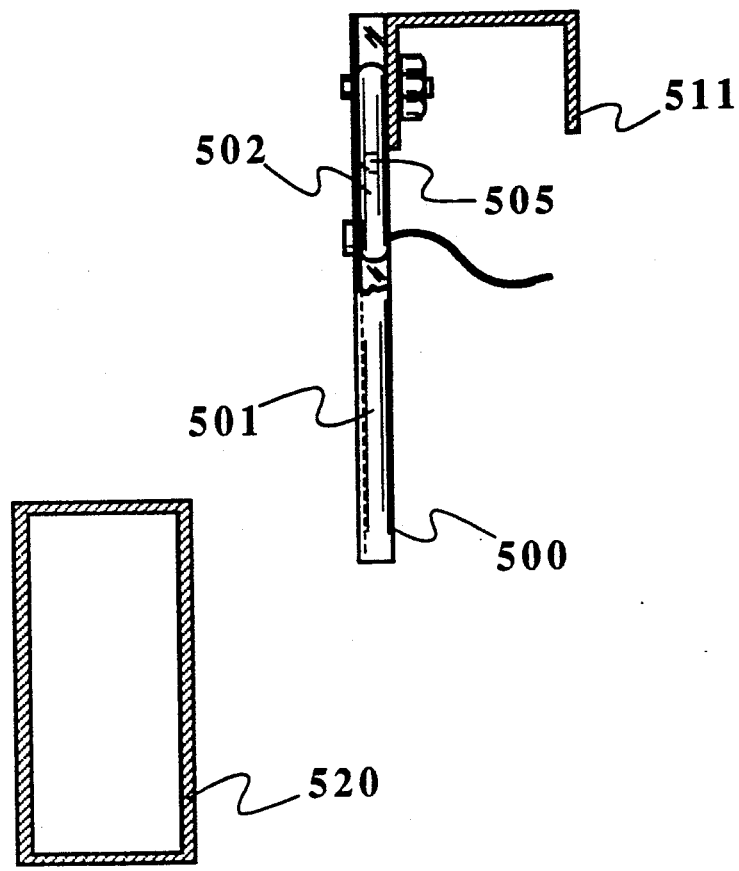
FIG. 5A is a view as in FIG. 2 with an alternate sensor and bracket design using a cantilevered bracket.

In FIG. 5A the simplest configuration of the sensor and bracket assembly 500 is illustrated where a straight bracket 501 is cantilevered vertically downward from the top of the supporting structure 511. The elongate bracket 501 projects sufficiently downward so as to interact with the bumper 520 during a crash. The particular sensor 502 illustrated is shown as a crush switch sensor and is described in co-pending U.S. Pat. application No. 727,756. The bracket 501 is designed with a weakened portion at the midpoint of the sensor 505 which causes the sensor to bend at its midpoint and trigger as disclosed in the referenced co-pending patent application. This configuration would be used when the vehicle is designed to minimize the chance of under-carriage or bumper over-ride hangups through the use of skid plates, a low bumper or other structure. In general it is desirable for the bracket to extend to the bottom radiator support 510 since when it is cantilevered in this fashion it may be prone to vibration especially if it is long. This configuration would be used particularly when the radiator vertical height is small or when other parts of the vehicle prevent attachment to the lower radiator support 510 or similar structure.

Figure 5B:
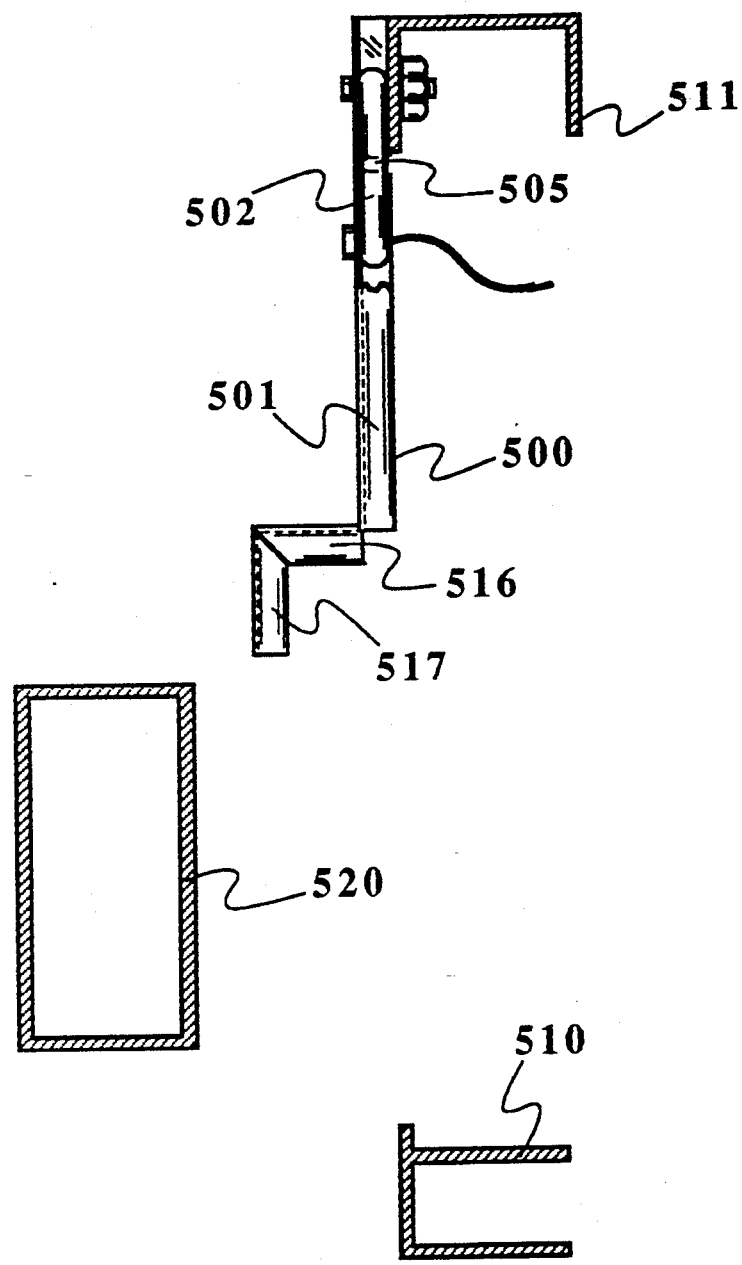
FIG. 5B is a view as in FIG. 2 with an alternate sensor and bracket design using a cantilevered bracket with an extension where the bracket does not engage the bumper in a crash.

FIG. 5B illustrates the case where bumper interaction is not desired or when the sensing time is very short and the crush zone is in front of the radiator support structure. This configuration has the same limitations as that illustrated in FIG. 5A. In this case the bracket is bent and with a portion 516 projecting forward. A vertical pusher 517 is provided to increase the area that is available for impact during the crash.

Figure 5C:
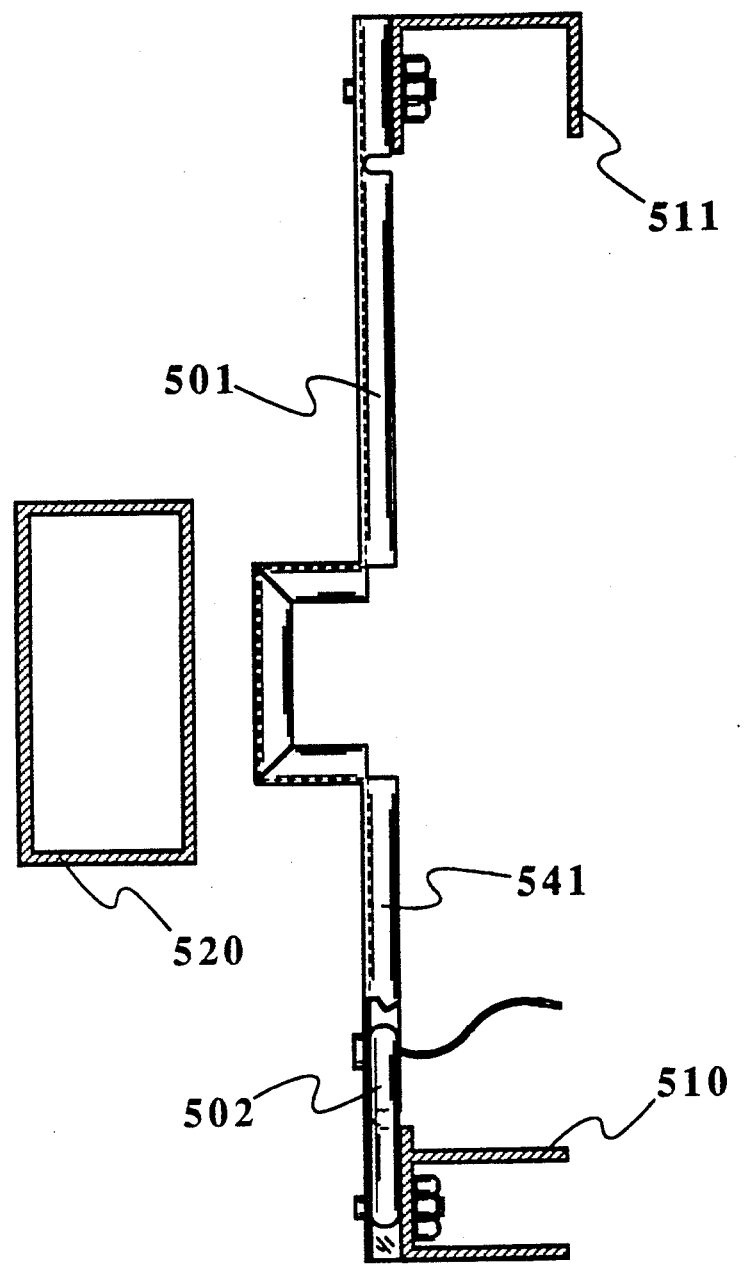
FIG. 5C is a view as in FIG. 2 with an alternate sensor and bracket design using a doubly supported bracket with the sensor mounted at the bottom.

FIG. 5C shows a case similar to FIG. 1 but with the sensor 502 located at the bottom radiator support 510. This has the advantage of removing the sensor and wires from the top of the radiator support where, in some cases, it might be more prone to damage during repairs or maintenance on the vehicle. Since it is closer to the point on the bracket 541 which is struck by the bumper 520, it may require less deflection to trigger depending on the bracket design, and thus the surface 541 closest to the bumper 520 can be located further back.

Figure 5D:
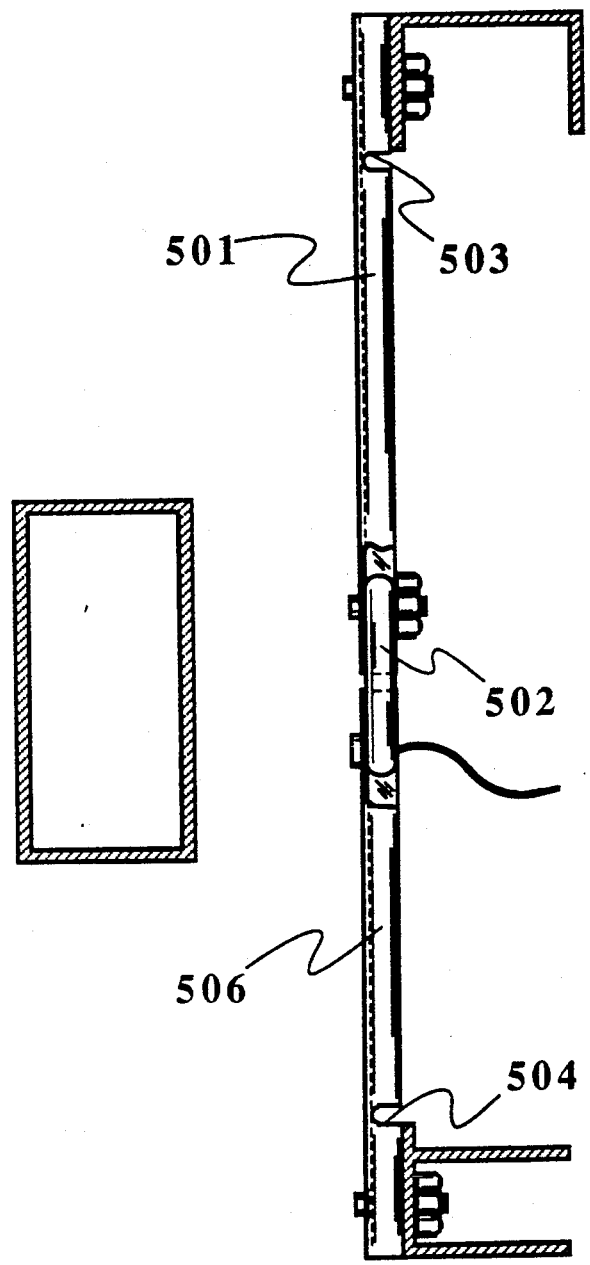
FIG. 5D is a view as in FIG. 2 with an alternate sensor and bracket design using two brackets with the sensor connecting the brackets.

FIG. 5D illustrates the case where the sensor 502 is used to bridge two brackets 501 and 506 resulting in a very thin simple design. In this case the bracket could be intentionally weakened at points 503 and 504 near to its attachment to the top and bottom supports. In this case also, substantially more deflection is needed to cause the sensor to trigger and this arrangement could be used with a large vehicle having a soft front end and a long sensor required triggering time or for the case where the radiator support structure is located far forward in the vehicle.

Figure 5E:
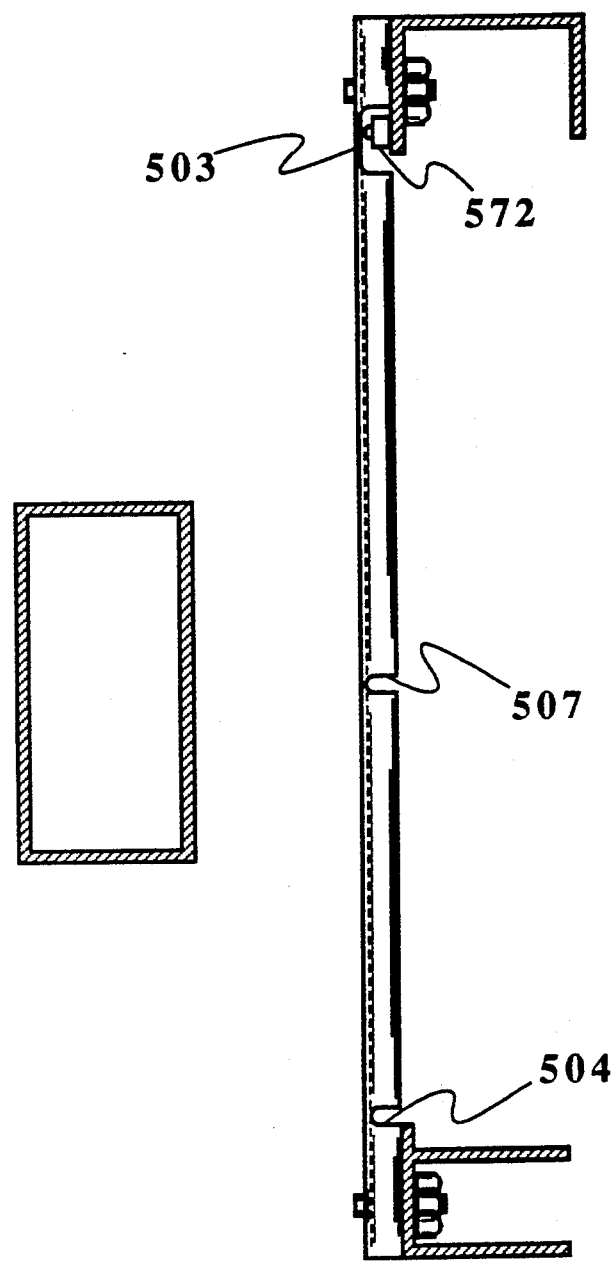
FIG. 5E is a view as in FIG. 2 with an alternate sensor and bracket design using a push button switch sensor mounted separate from the bracket and used in combination with it.

FIG. 5E illustrates how the design could be modified to use an alternate crush switch such as described in U.S. Pat. No. 4,995,639 to D. S. Breed and which is included herein by reference. In this view, the switch is illustrated schematically as a simple push button switch which closes an electrical circuit when button 572 is depressed. Once again, the bracket is initially weakened at points 503, 504 and at its midpoint 507 to promote controlled bending as described below. Other switches could be used such as a Hall effect based switch, a magnet and reed switch etc.

Figure 5F:
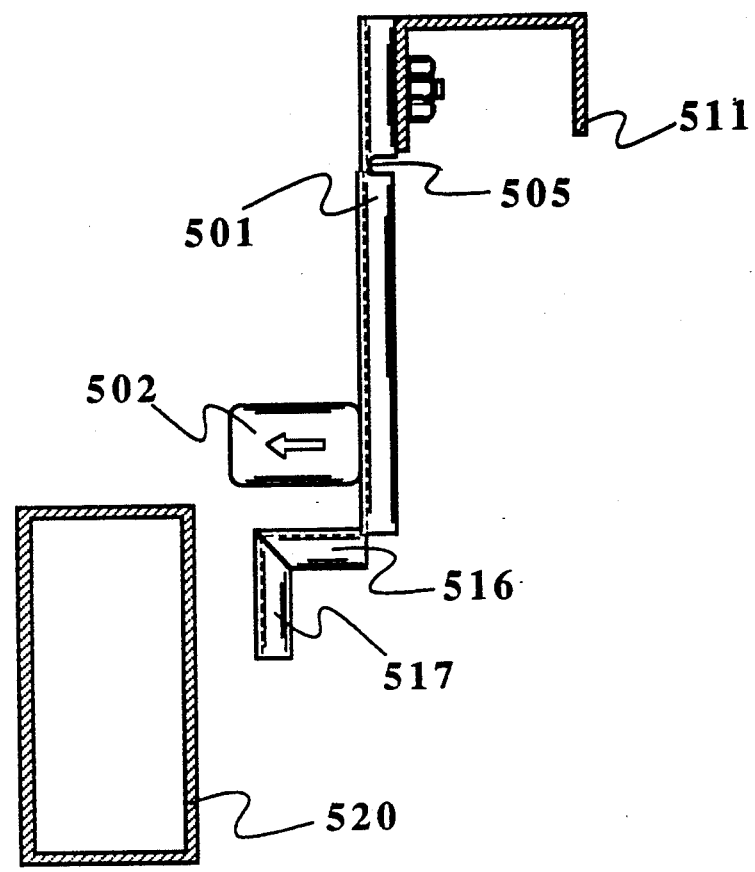
FIG. 5F is a view as in FIG. 2 with an alternate sensor and bracket design using a cantilevered bracket having an extension and using a seismic sensor.

FIG. 5F illustrates the use of this invention with conventional seismic mass crash sensors 502 such as illustrated, for example, in U.S. Pat. Nos. 4,536,629 to R. W. Diller and 4,573,706 to D. S. Breed. In this case the sensor could be located above the bumper, and the bracket extension 516 and pusher 517 serve to place the sensor effectively into the crush zone while offering some protection to the sensor itself.

For those cases where the seismic mass sensor is mounted behind the bumper or where the crush zone extends closer to the supporting structure, the configuration shown in FIG. 5G would be applicable. In this case sensor 502 is directly impacted by the bumper or crushed material in front of the sensor and therefore the protection of a metal can would probably be required.

Figure 5H:
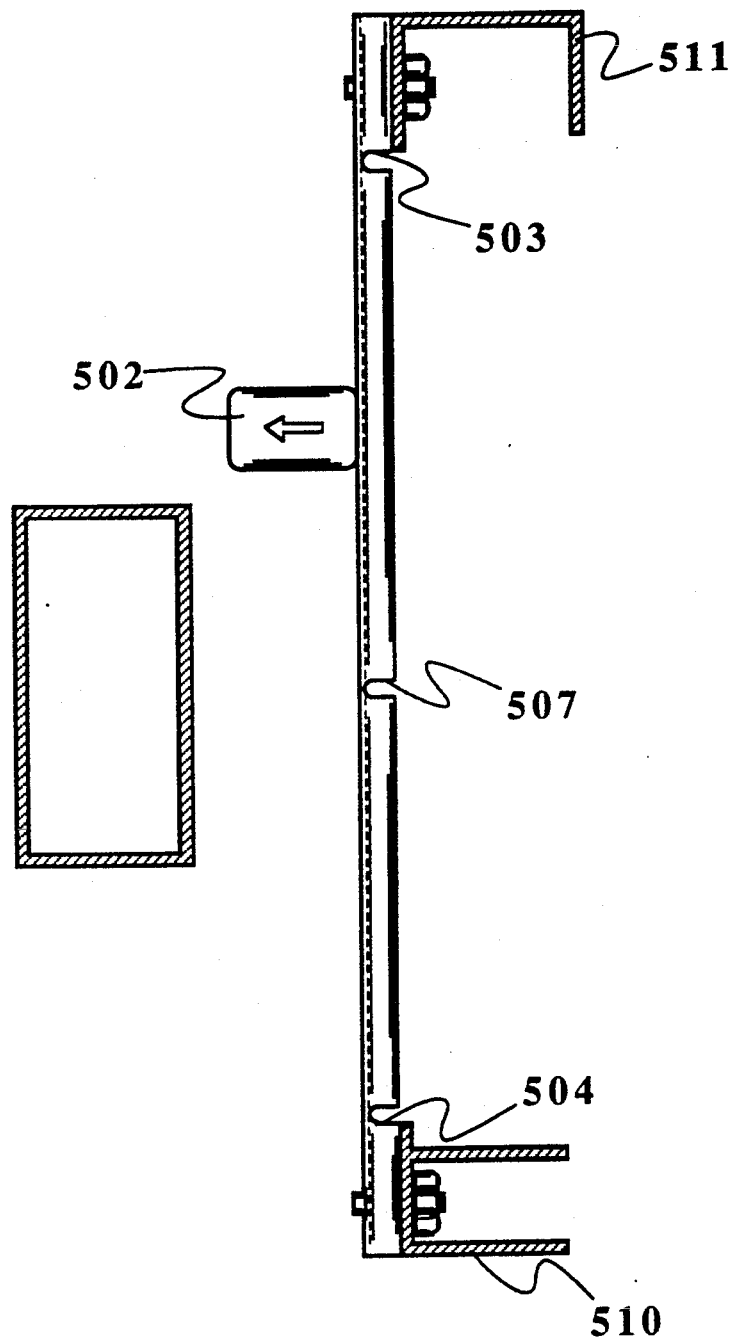
FIG. 5H is a view as in FIG. 2 with an alternate sensor and bracket design using a doubly supported bracket with a seismic sensor mounted onto the bracket but forward of it.
Figure 5I:
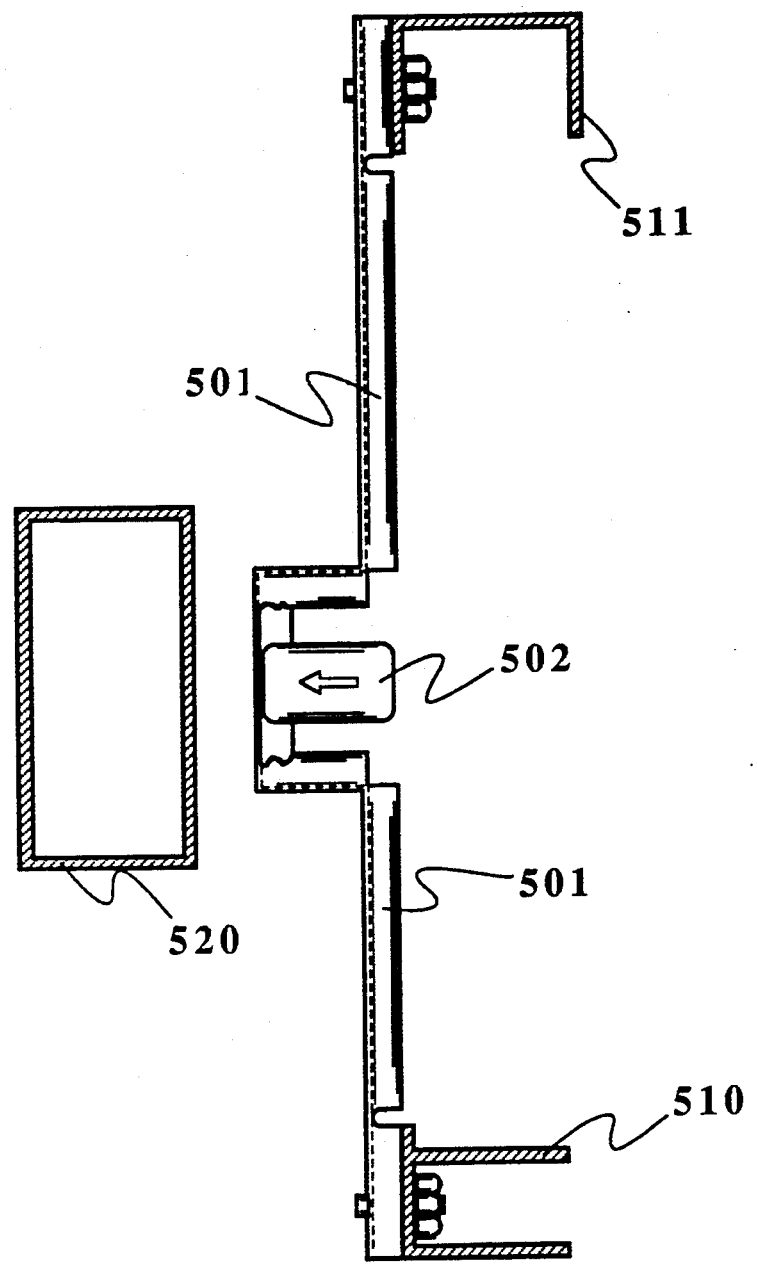
FIG. 5I is a view as in FIG. 2 with an alternate sensor and bracket design using a doubly supported bracket with a seismic sensor mounted onto the bracket but rearward of it.

The bracket 501 of FIG. 5G can of course be extended and attached to the bottom support structure 510 as shown in FIG. 5H and in some cases the sensor 502 can be mounted onto the rear side of the bracket 501 as shown in FIG. 5I where the bracket can be used to protect the sensor. In some cases the bracket would be sufficiently strong as to offer significant protection to the sensor, removing the need for the sensor to be mounted inside a metal can. In the same way that this is done in the crush switch sensor described in co-pending U.S. Pat. application No. 727,756 referenced above, these seismic mass sensors could be encapsulated entirely in rubber offering smaller size and weight and superior sealing from the environment as described in the referenced patent application.

The configurations using seismic mass sensors illustrated in FIGS. 5F through 5I are significant advances to the state of the art. Heretofore, these sensors, when they have been mounted in the crush zone, have been only capable of sensing crashes in time when they are directly impacted by crushed material. In order to cover the entire front of the vehicle, three sensors have sometimes been required, one mounted high in the center of the radiator support to catch under-ride crashes and two mounted low on the sides to catch angle crashes. This stems from the fact that these sensors have been point sensors. The configurations illustrated here permit the extension of the area of the front of the vehicle where the sensor can sense crashes through the use of an elongate bracket which if impacted will cause the sensor to trigger even if the sensor itself is not struck directly.

The configurations using seismic mass sensors illustrated in FIGS. 5F through 5I are also significant advances to the state of the art of seismic sensors since for the first time the motion of the bumper is directly sensed. This has the advantages described above as well as permitting the sensor to be mounted further to the rear in the vehicle.

The configurations illustrated in FIGS. 5F through 5I also sometimes permit mounting of the sensor further to the rear in the vehicle making it less susceptible to damage during repairs and maintenance on the vehicle or abuse during the life of the vehicle. Furthermore, a major problem of currently configured sensor and bracket assemblies where the bracket is very short is that the sensor can rotate significantly in low speed soft crashes causing its sensing axis to point downward at an angle degrading the sensor performance. In soft crashes, the rearward displacement of the sensor while it is sensing the crash can exceed 4 inches. If the sensor bracket vertical member is only 2 inches long, this can result in a significant degradation in sensor performance and may even prevent it from triggering when the occupant restraint is needed. The configurations shown here all have an elongate bracket member resulting in much less sensor rotation as it is displaced rearward in an accident.

Figure 6:
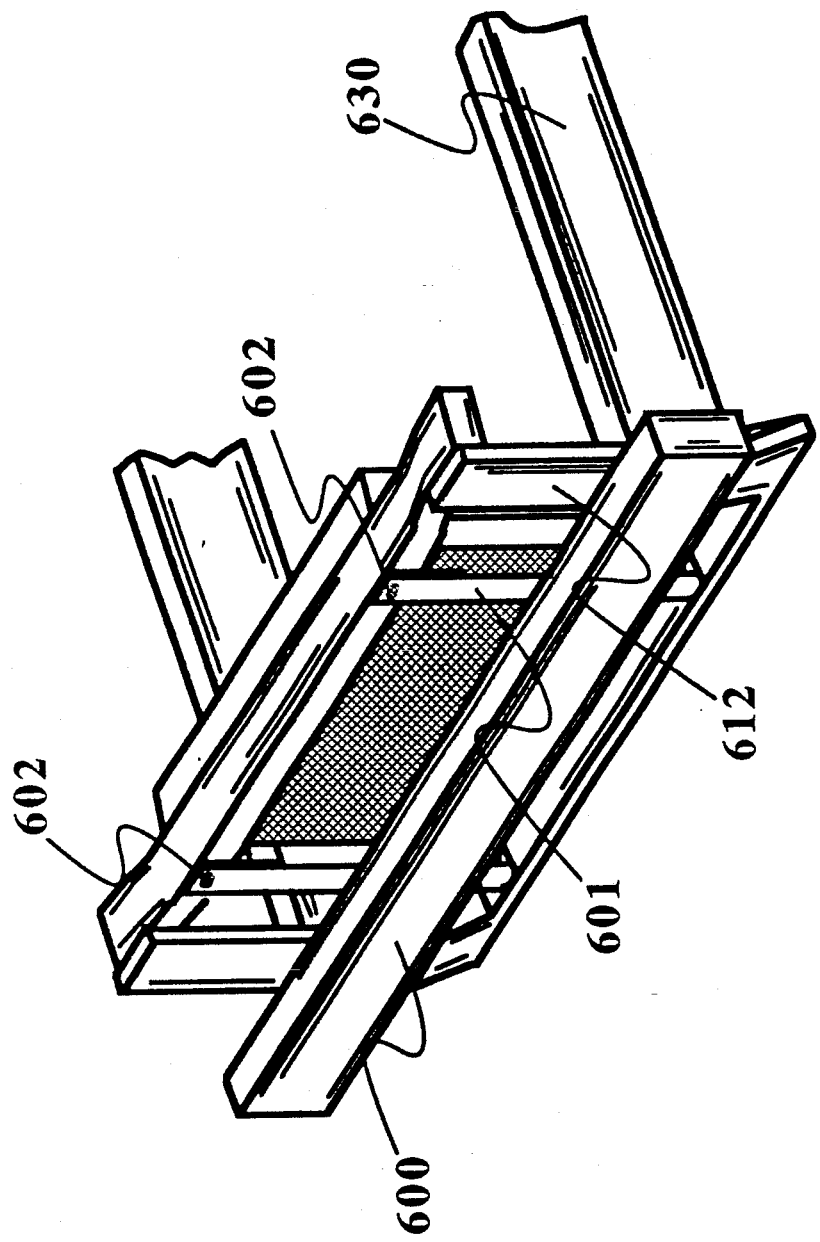
FIG. 6 is a perspective view, with certain portions removed or cut away, of a portion of the front of a vehicle showing preferred mounting locations of the sensor and bracket assembly of this invention in relationship to the frame rails, radiator and radiator support structure, and bumper of a sub-compact vehicle.

FIG. 6 is an illustration of a vehicle front end and will be used to show how two sensor and bracket assemblies 600 of this invention can be used to timely sense all crashes involving the front of the vehicle. The particular lateral spacing of the sensor and bracket assemblies across the front of the vehicle depends on the position of the crush zone in angle crashes and the thin pole crash on centerline. The shape and spacing of the brackets 601 in the fore and aft direction depends, as discussed in detail above, on the position of the crush zone on frontal barrier, under-ride and over-ride impacts. Generally all of these spacing dimensions will differ from vehicle to vehicle.

In FIG. 6, A sensor 602 is mounted onto the elongate bracket 601. 630 represents the vehicle rails, 620 the bumper and 612 the vertical radiator supports.

For the pole on centerline crash, the bumper will usually bend in the center and wrap around the pole. As it deflects inward it will rotate about its support to the vehicle structure frequently called the rails. Since the radiator support is also attached, usually indirectly, to the same structure it will also eventually bend in the center and rotate about a vertical axis somewhat behind and usually inboard but sometimes outboard of the axis of rotation of the bumper. The radial distance of the brackets from the axes of rotation of the bumper and radiator respectively can become an important consideration. If, for example, the brackets are located near to the two axes of rotation, substantial penetration of the pole into the vehicle can result before the bracket or sensor is impacted resulting in a late triggering. On the other hand, if the brackets are located too far inboard, close to the centerline of the vehicle, they could trigger late on angle barrier impacts. These considerations plus the available space in the front of the vehicle dictate the lateral bracket locations. This is rarely a problem since generally in pole crashes, the bumper bends in the center and begins crushing the soft radiator structure long before the pole impacts both the top and bottom radiator supports causing the radiator to bend and rotate. Also it is rare that these deformations and rotations happen in such a symmetrical manner.

The impact of a low pole on center line deserves some discussion since it illustrates a particular feature of the flex action crush switch sensors described in copending U.S. Pat. application No. 727,756 referenced above. In some vehicles, such an impact can cause the lower radiator support to bend at its center without causing any other significant deformation of the front of the vehicle up to the time that sensor triggering is required. In this case there may be little bending but significant twisting of the brackets 601. The flex action crush switch sensor is designed to trigger in either the bending or the twisting mode and therefore in this case it will trigger in time whereas all conventional sensors located near the top radiator support will either not trigger or trigger late.

Conventional seismic sensors have on occasion been mounted onto existing vehicle structure which may on first observation appear to practice the teachings of this invention. In one case it has been proposed to mount the sensor onto the vertical hood latch brace structure which is located in front of the radiator support. In this case the sensor has been cantilevered laterally from the brace and then projected forward to place the front surface of the sensor into the crush zone. In this case, the sensor has been attached to the bracket so that it will move relatively to the hood latch brace during the crash. The particular location of the hood latch brace on this vehicle is rearward of the crush zone for frontal barrier impacts even when it passes behind the bumper and thus it is being used merely as a convenient mounting location for the seismic sensor. If a horizontal member were attached to the hood latch brace behind the bumper so as to place it into the crush zone, then the hood latch brace could be used as an elongate bracket as taught by this invention and there would be no need to project the sensor forward of the brace. This fact has not been appreciated and thus the current installation using the hood latch brace is quite complicated.

In other cases, seismic sensors have been mounted directly to the vertical radiator support members. However, these members are generally not in the crush zone. For barrier crashes, in some cases, they are in a sort of transition zone which sometimes results from poor vehicle structural design as discussed below. In these cases the sensors are not true crush zone sensors and are designed to trigger at much lower velocity changes.

A discussion of the crush zone and of the problem of sensing in the non-crush zone can be found in the SAE Papers Nos. 880724 ("Problems in Design and Engineering of Air Bag Systems"), 890750 ("Trends in Sensing Frontal Impacts"), 900548 ("Are Barrier Crashes Sufficient for Evaluating Air Bag Sensor Performance"), and 920124 ("A Critique of Single Point Crash Sensing") which are included herein by reference. To summarize, the vehicle can be ideally divided into two parts at the moment in time when the sensor is required to trigger, the crush zone and the non-crush zone. In a frontal barrier impact the crush zone is that portion of the vehicle that has essentially stopped and the non-crush zone is still moving at nearly the pre-crash velocity. Naturally, there is another zone which might be called a transition zone which is between the crush zone and the non-crush zone. This transition zone is usually sufficiently small that it can be neglected. Vehicles are generally designed to crush progressively from the front of the vehicle. One of the reasons for this is to minimize repair costs by keeping the damage to the vehicle as close to the front as possible. In some vehicles, however, the ideal is not achieved and the crush is distributed over a significant distance from the front of the vehicle. In these cases the radiator support might have a velocity somewhere in between the crush zone and the non-crush zone and sensor designers have empirically discovered this fact and mounted specially calibrated sensors to structure located in this transition zone. Since these locations are not in the crush zone, these designs do not practice the teachings of this invention.

Figure 7:
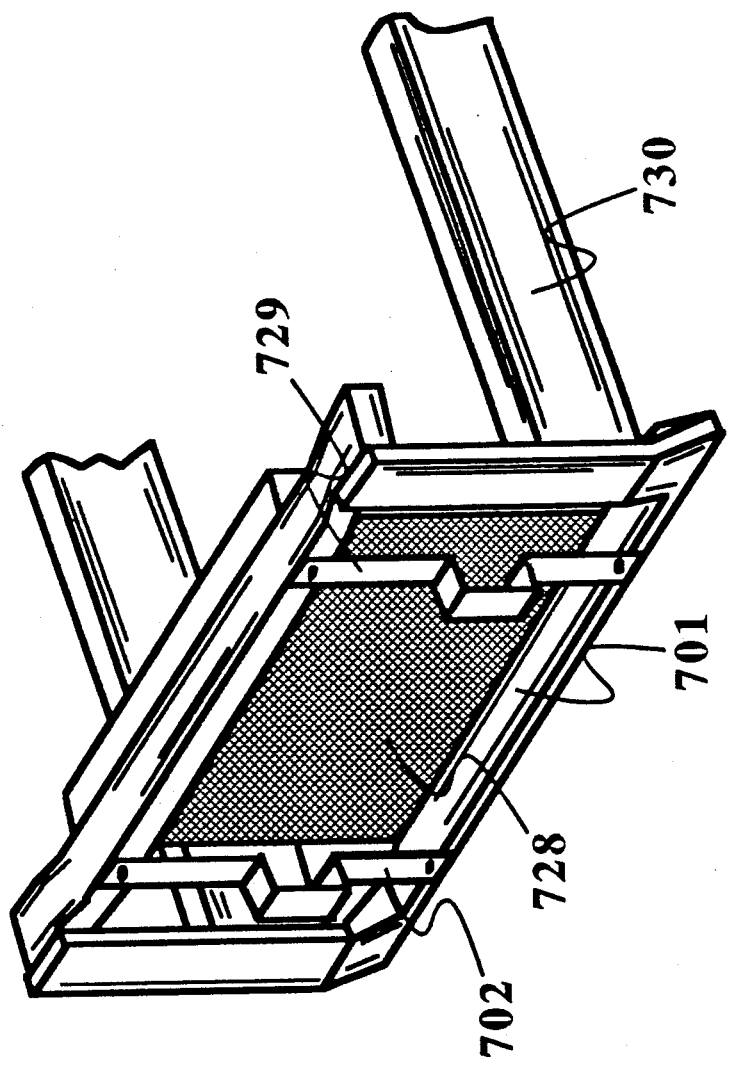
FIG. 7 is a similar view as in FIG. 6 with an alternate mounting scheme of the sensor and bracket assemblies and with the bumper removed.

In most cases, the sensor and bracket assembly of this invention would lie primarily in a vertical orientation. In some cases it might be desirable to practice of the teachings of this invention using elongated brackets lying in a primarily horizontal orientation or even on some intermediate angle if the geometry of the crush zone and the vehicle structure warrants. One example is shown in FIG. 7 and another in FIG. 8. In FIG. 7 the sensor and bracket assembly stretches horizontally across the vehicle while in FIG. 8 an angle bracket structure is used. In FIG. 7 the presence of a strong vertical structural member 724 in the center of the vehicle can be used to anchor the brackets along with side structural members 725 and 726 which may be the vertical radiator supports. This configuration should catch all crashes in a similar manner as the configuration shown in FIG. 6. This configuration is particularly good at catching all pole crashes in a timely manner. In FIG. 7, 730 represents the vehicle side rails and 702 the sensor.

Figure 8:
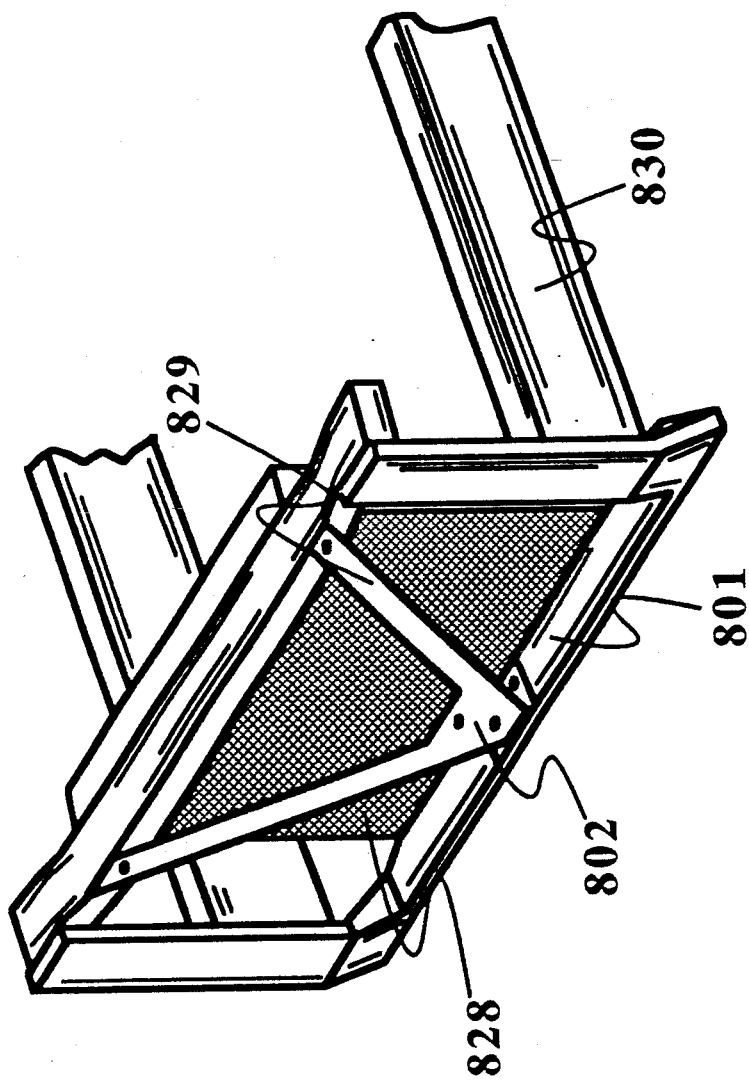
FIG. 8 is a similar view as in FIG. 7 with a single bracket and sensor assembly and two bracket sections placed on angles.

In FIG. 8 a single sensor 802 is used in conjunction with three brackets 801, 828 and 829. This an example of single point sensing which will catch soft as well as barrier impacts. In addition it is the first example of single point sensing where the sensor is located in the crush zone.

There is a great deal of research underway to devise algorithms for electronic sensors which will permit the sensing of all crashes from a single point in the non-crush zone. This is generally known as single point sensing. Heretofore, no attempt has been made to devise a single point sensor for the crush zone, although one manufacturer uses a single sensor usually mounted at the center on the top radiator support. This sensor is used in parallel with a passenger compartment mounted discriminating sensor which is designed to trigger on many of the crashes which are missed by the single crush zone sensor.

FIG. 8 is one example of how single point sensing in the crush zone can be accomplished. FIG. 8 illustrates one method of how the crush zone can be brought to the sensor for a wide variety of frontal impacts where the sensor is not actually mounted in the crush zone. Naturally, other techniques will now suggest themselves to those skilled in the art including a careful design of the vehicle front end to make use of vehicle structural members to transmit the crash pulse to the sensor.

The key difference between this implementation of single point sensing and others is that the sensor senses the crush zone pulse which is a large velocity change compared to the non-crush zone pulse which is a relatively small velocity change. In this manner, for the first time, all frontal crashes requiring the deployment of a restraint system can be sensed in time which has been shown in the above referenced SAE papers not to be possible for sensors which sense the non-crush zone crash pulse alone. Naturally such a single point sensing system could use electronic, seismic as well as crush switch sensors and also comprise an arming sensor located in the non-crush zone to guard against deployment of the restraint system due to maintenance as disclosed in the above referenced patents.

FIGS. 9A and 9B are rear and side views of a simple straight bracket for use with a sensor according to the teachings of this invention. The bracket is constructed from C-channel steel in order to give rigidity with low weight to the bracket. The bracket is shown generally at 900 and consists of a two web portions 901 and 902 and a flange 903. The sensor, not shown, is mounted to the bracket by way of a key way 906 and hole 907. Integrally molded into the sensor is a button shaped mounting member with a head and a shank. The head is pushed through the larger diameter hole in the key way 906 and slid upward in the drawing where the narrow portion of the key way engages the shank of the mounting member. The other end of the sensor is secured to the bracket and the bracket is also secured to the radiator tie bar or other vehicle structural member by means of a bolt which passes through hole 907. The other end of the bracket is secured to another vehicle structural member by a bolt through hole 907.

The bracket can be initially weakened at the three points 918, 919 and 920, however sometimes only a single or two weakened points suffice. The weakened points 918 and 919 are designed to promote bending in either direction while the weakened point 920 permits significant bending in only one direction. In this manner, when the bracket is mounted onto a vehicle and impacted at any point between its mounting points, the bracket will bend inward and bend the sensor. If, on the other hand, the lower mounting structure is impacted the entire bracket will bend about points 918 and 919 and weakened point 920, after a small initial bending, will not bend further. Although several examples have been shown where the bracket is intentionally weakened at several points, in some cases this is not done and the only area where the bracket is intentionally weakened is at the sensor midpoint.

Figure 10:
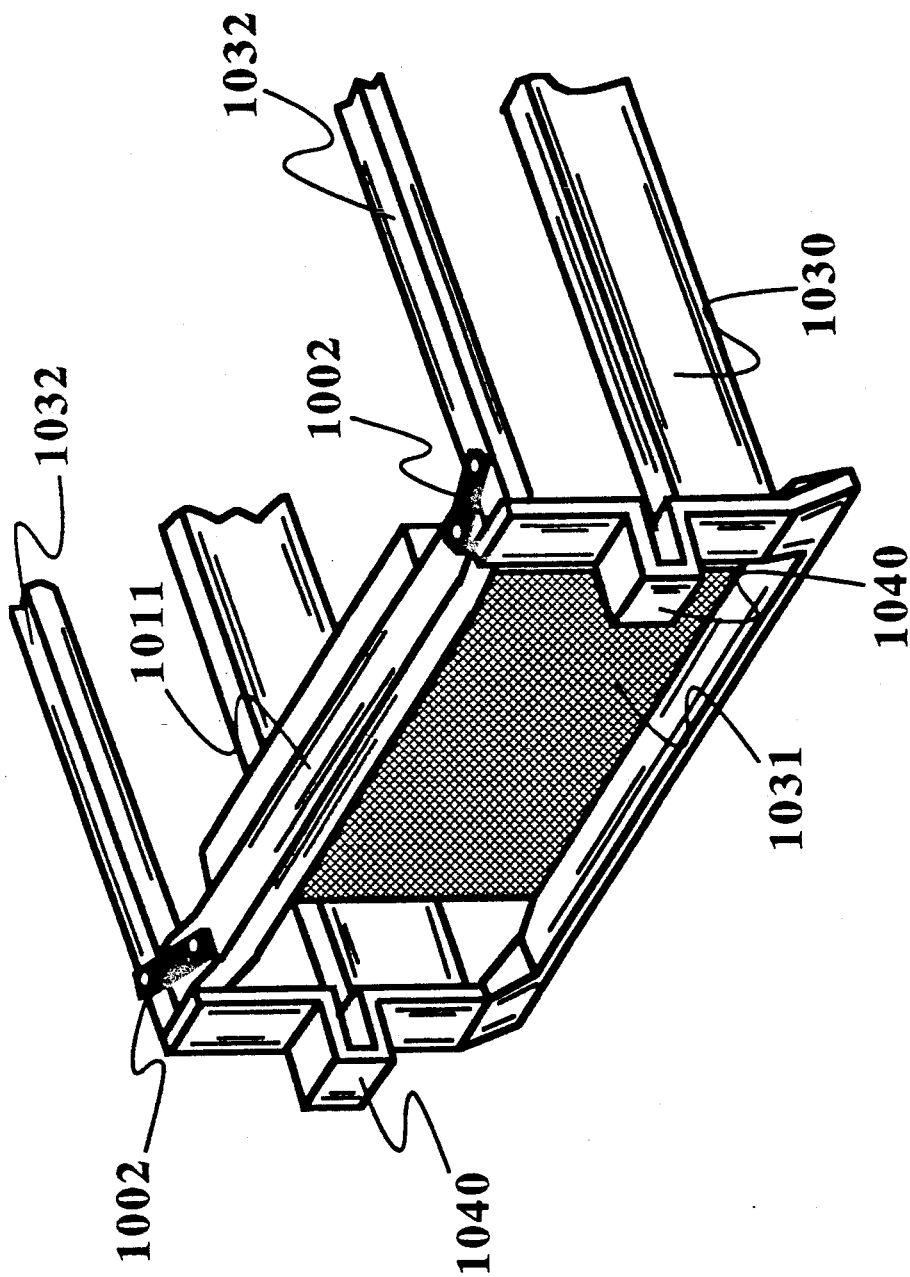
FIG. 10 is a perspective view, with certain portions removed or cut away, of a portion of the front of a vehicle showing preferred mounting locations of the sensors with the functions of the bracket assembly incorporated into the radiator supporting structure.
Figure 11:
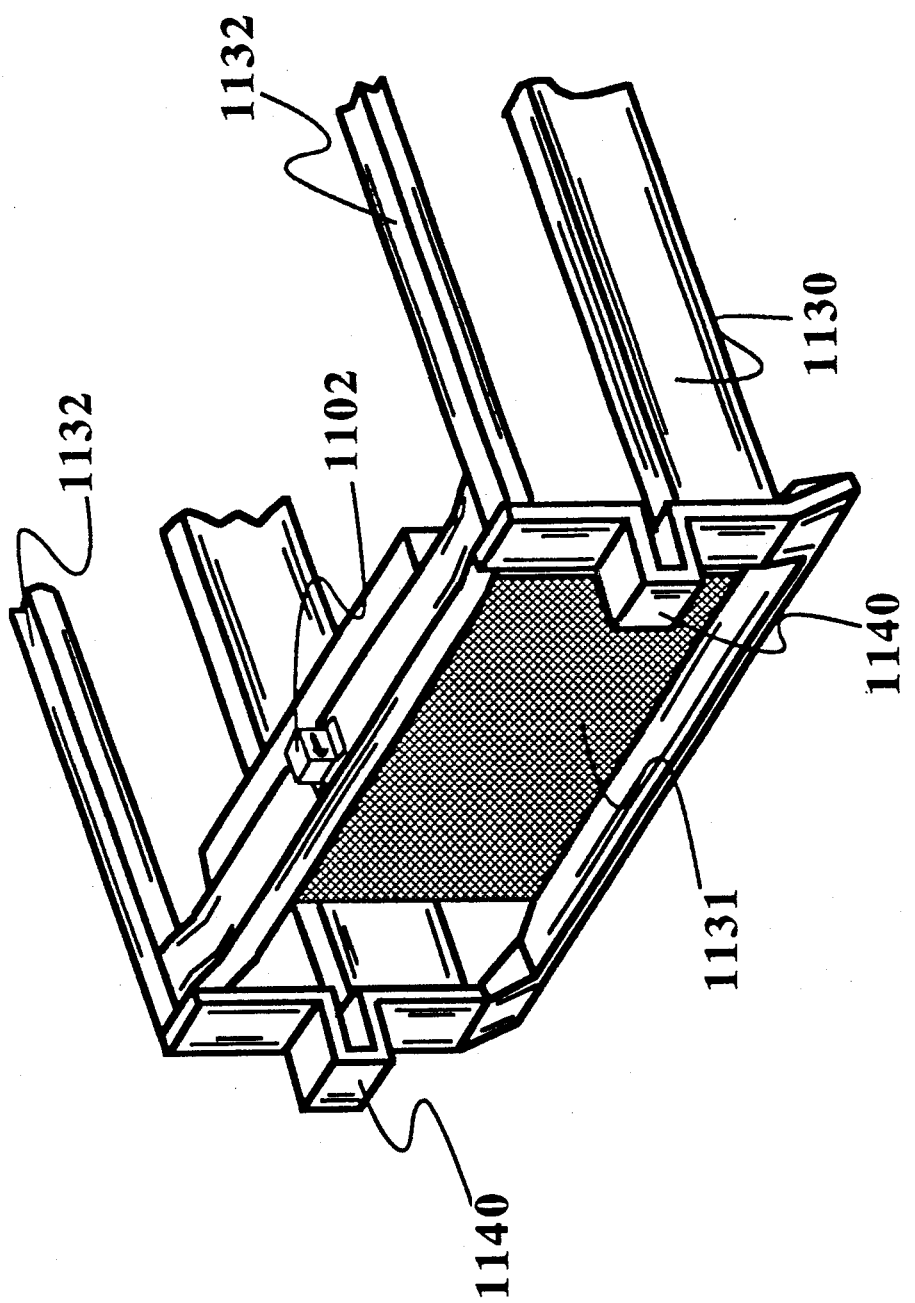
FIG. 11 is a view similar to FIG. 10 where a single seismic sensor such as a ball-in-tube or electronic sensor is used.

Another example, Illustrated in FIGS. 10 and 11, of the implementation of the teachings of this invention, is to add additional structure, such as extenders 1040, to the radiator support structure of a vehicle which would engage the bumper at the proper depth of penetration. In this case, when the bumper is forced rearward in a crash to the depth corresponding to the boundary of the crush zone, the radiator support extenders would engage the bumper and the radiator support structure would then be forced rearward causing the sensors 1002, which are attached to the radiator support 1011 and the upper structural member 1032, to bend and trigger.

A single ball-in-tube sensor or an electronic sensor 1102, located on the radiator tie bar, for example, could also be used to sense the crash and deploy the restraint system. In this case, the radiator extenders would transmit the velocity of the bumper to the sensor through the radiator support structure. These extenders and radiator support structure would thus be acting in a similar manner as the elongate brackets shown in FIGS. 7 and 8 but would be integrated into the vehicle structure. In both of these cases, impacts to either the right or the left of the front end of the vehicle would also be sensed. Similarly, under-ride and over-ride impacts could also be sensed by a single sensor, or by two sensors, through this addition or modification of the appropriate structure.

Many configurations have been discussed and illustrated above and many other configurations will now suggest themselves to those skilled in the art. It has been shown that the sensor can sense the deformation of the bracket or cause the deformation, that is, that either the bracket or the sensor may be hit during the crash. Although generally a single bracket has been used with a sensor, a plurality of brackets could also be used with a single sensor to extend its influence over a greater portion of the front of the vehicle. In general the sensor will be mounted at one end of the bracket but in some cases it may be mounted between the ends of the bracket or it might not even be mounted on the bracket at all but respond to the motion of the bracket. In general the bracket is expected to be part of the sensing structure and it is expected that it will be struck during the crash, but in some cases it may serve merely to place the sensor in a particular position in the crush zone such as behind the bumper or the elongate shape may serve mainly to reduce the rotation of the sensor during soft impacts. The bracket can also be used to remove the sensor itself from the crush zone while retaining the effects of its being in the crush zone. This can reduce the cost and improve the reliability of conventional seismic sensors as disclosed above.

It has been shown that the sensing of pole impacts has been enhanced through the use of the motion of the bumper and that now, for the first time, low pole impacts and impacts that only involve the bumper can be sensed in a timely manner.

The teachings of this invention can be used with a variety of sensors including those which respond to force, acceleration, velocity change or displacement. Also the brackets can be orientated in either a vertical, angular or horizontal direction and may be either straight or bent depending on the particular requirements of the vehicle.

There has thus been shown and described an improved crash sensor and bracket assembly and vehicle structure which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. In a motor vehicle having a front end and occupant protection apparatus which is deployed in the event of a front end that crushes the front end of the vehicle to a prescribed depth requiring deployment of said occupant protection apparatus, said prescribed depth being the rearmost boundary surface of the crush zone at the time that sensor triggering is required, said boundary located between the crushed front end and the remainder of the vehicle, a displacement measuring device for determining that said front end of said vehicle has crushed to said rearmost surface of the crush zone comprising:
   (a) an elongate bracket mounted in said front end of said vehicle, at least a part of said bracket is at said rearmost surface of the crush zone, said bracket having two ends and a strip of deformable material between said two ends; and
   (b) sensing means for sensing the physical deformation of said bracket during a front end impact of said vehicle to initiate deployment of said occupant protection apparatus.

2. The improvement in accordance with claim 1 wherein said deformation is by twisting.

3. The improvement in accordance with claim 1 wherein said deformation is by bending.

4. The improvement in accordance with claim 1 wherein said elongated bracket lies primarily in the vertical direction.

5. The improvement in accordance with claim 4 wherein two sets of said elongate brackets and associated sensors are used mounted displaced either side of the vehicle centerline.

6. The improvement in accordance with claim 1 wherein a portion of said bracket is positioned so as to be impacted by the vehicle bumper as said bumper is displaced to a prescribed depth.

7. The improvement in accordance with claim 1 wherein said sensing means comprises a switch.

8. The improvement in accordance with claim 1 wherein said sensing means comprises a seismic mass sensor.

9. The improvement in accordance with claim 8 wherein said seismic mass sensor comprises a ball-in-tube sensor.

10. The improvement in accordance with claim 1 wherein said elongate bracket contains at least one area which has been weakened so as to promote controlled bending during deformation.

11. The improvement in accordance with claim 1 wherein said sensing means is mounted on said bracket.

12. In a motor vehicle having a front end, a bumper located in said front end, and occupant protection apparatus which in the event of a front end impact that displaces at least a portion of the bumper of the vehicle to a prescribed depth requiring deployment of said occupant protection apparatus, said prescribed depth being the rearmost surface of the crush zone boundary between the crushed front end and the remainder of the vehicle at the time that sensor triggering is required, the improvement comprising: sensing means comprising an elongate bracket mounted substantially vertically and positioned in said front end of said vehicle behind said bumper, at least a portion of said bracket located at said prescribed depth, said means responsive to the displacement of said bumper portion reaching said prescribed depth during a front end impact of said vehicle to initiate deployment of said occupant protection apparatus.

13. The improvement in accordance with claim 12 wherein the of said elongate brackets are used mounted displaced on either side of the vehicle centerline.

14. The improvement in accordance with claim 12 wherein said sensing means further comprises a switch.

15. The improvement in accordance with claim 12 wherein said sensing means further comprises a seismic mass sensor.

16. The improvement in accordance with claim 15 wherein said seismic mass sensor comprises a ball-in-tube sensor.

17. The improvement in accordance with claim 1 wherein said elongate bracket contains at least one area which has been weakened so as to promote controlled bending.

18. In a motor vehicle having a front end with a high portion and a low portion, and an occupant protection apparatus which is deployed in the event of a front end impact that crushes at least one of said high portion to a first prescribed depth and said low portion to a second prescribed depth requiring deployment of said occupant protection apparatus, said first prescribed depth and said second prescribed depth being portions of the rearmost surface of the crush zone boundary between the crushed front end and the remainder of the vehicle at the time that sensor triggering is required, the improvement comprising:

(a) an elongate bracket having a plurality of sections, said bracket mounted in said front end of said vehicle positioned so that a section of said bracket is located at least at each of both of said prescribed depths, said bracket having two ends and a strip of bendable material between said two ends, said sections being physically deformable, and (b) sensing means for sensing the deformation of at least one section located at either of said portions of said front end during a front end impact of said vehicle to initiate said deployment of said occupant protection apparatus.

19. The improvement in accordance with claim 18 where said high portion comprises that portion of the vehicle located above the bumper.

20. The improvement in accordance with claim 18 where said low portion comprises that portion of the vehicle located below the bumper, 21. The improvement in accordance with claim 18 wherein said elongate bracket lies primarily in the vertical direction, 22. The improvement in accordance with claim 21 wherein two sets of said elongate brackets and associated sensors are used mounted displaced on either side of the vehicle centerline.

23. The improvement in accordance with claim 18 wherein a portion of said bracket is positioned so as to be impacted by the vehicle bumper as said bumper is displaced to a prescribed depth.

24. The improvement in accordance with claim 18 wherein said sensing means comprises a switch, 25. The improvement in accordance with claim 18 wherein said sensing means comprises a seismic mass sensor, 26. The improvement in accordance with claim 25 wherein said seismic sensor comprises a ball-in-tube sensor.

27. The improvement in accordance with claim 18 wherein said elongate bracket contains at least one area which has been weakened so as to promote controlled bending upon impact.

28. The improvement in accordance with claim 18 wherein said elongate bracket lies primarily in the horizontal direction.

29. In a motor vehicle having a front end with a right portion and a left portion, and an occupant protection apparatus which is deployed in the event of a front end impact that crushes at least one of said right portion to a first prescribed depth and said left portion to a second prescribed depth requiring deployment of said occupant protection apparatus, said first prescribed depth and said second prescribed depth being portions of the rearmost surface of the crush zone boundary between the crushed front end and the remainder of the vehicle at the time that sensor triggering is required, a displacement measuring device for determining that said front end right or said front end left portion of said vehicle has crushed to at least one of said prescribed depths comprising:

(a) transmission means having a plurality of sections of said means mounted in said front end of said vehicle positioned so that a section of said means is located at both of said prescribed depths; and, (b) single sensing means for sensing the physical deformation of at least one of said sections occurring upon the displacement of either of said portions of said front end to each respective said prescribed depth during a front end impact of said vehicle to initiate deployment of said occupant protection apparatus.

30. The improvement in accordance with claim 29 where said transmission means transmits the velocity of said front end impact to said sensing means.

31. The improvement in accordance with claim 29 wherein said sensing means comprises a ball-in-tube sensor.

32. The improvement in accordance with claim 29 wherein said sensing means comprises an electronic sensor.

33. In a motor vehicle having a front end occupant protection apparatus which is deployed in the event of a front end impact that crushes the front end of the vehicle to a prescribed depth requiring deployment of said occupant protection apparatus, said prescribed depth being the rearmost surface of the crush zone boundary between the crushed front end and the remainder of the vehicle at the time that sensor triggering is required, the improvement comprising:
 (a) an elongate bracket mounted in said front end of said vehicle at said prescribed depth, said bracket having two ends and a strip of deformation material between said two ends; and
 (b) sensing means mounted adjacent to said bracket for sensing the deformation of said bracket during a front end impact of said vehicle that crushes said front end to said prescribed depth that crushes said front end to said prescribed depth at least one point along said boundary to initiate deployment of said occupant protection apparatus.

34. The improvement in accordance with claim 1 wherein said elongate bracket lies primarily in the horizontal direction.

35. The improvement in accordance with claim 1 wherein said prescribed depth is determined by the crush at a marginal frontal barrier impact.

36. The improvement in accordance with claim 1 wherein said prescribed depth is determined by the crush at the required sensor triggering time for a high speed barrier crash.

37. In a motor vehicle having a front end with a high portion and a low portion, and an occupant protection apparatus which is deployed in the event of a front end impact that crushes at least one of said high portion to a first prescribed depth and said low portion to a second prescribed depth requiring deployment of said occupant protection apparatus, said first prescribed depth and said second prescribed depth being portions of the rearmost surface of the crush zone boundary between the crushed front end and the remainder of the vehicle at the time that sensor triggering is required, the improvement comprising:
 (a) an elongate bracket having at least one section, said bracket mounted substantially vertically in said front end of said vehicle positioned as that a section of said bracket is located at least at each of both of said prescribed depths, said bracket having two ends and a strip of bendable material between said two ends; and
 (b) sensing means for sensing the deformation of at least one said section of said elongate bracket, in response to the crush of either of said portions of said front end to said respective prescribed depths during a front end impact of said vehicle, to initiate deployment of said occupant protection apparatus.

38. A method for deploying an occupant protection apparatus to protect occupants in a motor vehicle in the event of a front end impact that crushes the front end of the vehicle to a prescribed depth requiring deployment of said occupant protection apparatus, said prescribed depth being the rearmost boundary surface of the crush zone, said boundary located between the crushed front end and the remainder of the vehicle at the time that sensor triggering is required, comprising the steps of:
 (a) determining said rearmost boundary surface of the crush zone;
 (b) positioning an elongate bracket having two ends and at least one area of physically deformable material between said two ends such that said at least one area of said deformable material is located at said prescribed depth; and
 (c) sensing the physical deformation of said at least one area of deformable material of said elongate bracket upon said front end impact that crushes said front end of said vehicle to said prescribed depth to initiate said required deployment.

39. A method for deploying an occupant protection apparatus to protect occupants in a motor vehicle in the event of a front end impact that crushes at least one of a plurality of sections of the front end of the vehicle to respective prescribed depths requiring deployment of said occupant protection apparatus, said respective prescribed depths being portions of the rearmost surface of the crush zone boundary between the crushed front end and the remainder of the vehicle at the time that sensor triggering is required, comprising the steps of:
 (a) determining each of said respective prescribed depths, each of which represents portions of the rearmost boundary surface of the crush zone;
 (b) positioning at least one elongate bracket, each said bracket having two ends and at least one area of physically deformable material between said two ends, such that at least one area of said deformable material is located at each said respective prescribed depth; and
 (c) sensing the physical deformation of said at least one said area of physically deformable material of at least one said elongate bracket upon said front end impact that crushes said front end of said vehicle to at least one of said respective prescribed depths, to initiate said required deployment.

* * * * *